United States Patent [19]

Fremow et al.

[11] Patent Number: 4,717,120
[45] Date of Patent: Jan. 5, 1988

[54] DISCHARGE VALVE FOR BULK CONTAINERS

[75] Inventors: W. Douglas Fremow, Jeffersontown; Franklin E. Russell, Sr., Prospect, both of Ky.; Roger H. Ellert, San Clemente, Calif.

[73] Assignee: Boise Cascade Corporation, Boise, Id.

[21] Appl. No.: 48,779

[22] Filed: May 12, 1987

[51] Int. Cl.$^4$ .............................................. F16K 51/00
[52] U.S. Cl. ..................... 251/144; 251/86; 251/306; 137/556; 138/89; 220/465
[58] Field of Search ............ 251/144, 305, 306, 89.5, 251/90, 155, 86; 137/316, 556; 220/465; 138/89

[56] References Cited

U.S. PATENT DOCUMENTS

| 932,766 | 8/1909 | Daniels | 138/89 |
|---|---|---|---|
| 1,687,583 | 10/1928 | Nord | 220/465 |
| 2,567,426 | 9/1951 | Ferrari | 251/155 |
| 2,745,360 | 5/1956 | Lunde | 105/307 |
| 3,152,729 | 10/1964 | Piker | 220/465 |
| 3,215,400 | 11/1965 | Muller | 251/306 |
| 3,400,859 | 9/1968 | Thakar et al. | 220/465 |
| 3,980,272 | 9/1976 | Nalcai et al. | 251/306 |
| 4,093,178 | 6/1978 | Hughes et al. | 251/305 |
| 4,394,002 | 7/1983 | Polley | 251/144 |
| 4,540,457 | 9/1985 | LaValley | 251/305 |
| 4,585,143 | 4/1986 | Fremow et al. | 220/465 |

Primary Examiner—A. Michael Chambers
Attorney, Agent, or Firm—Laubscher & Laubscher

[57] ABSTRACT

An improved valve assembly is provided for dispensing liquid from bulk containers. The valve assembly includes a tubular housing defining a cylindrical chamber open at its ends. The housing is connected with an opening in the liner of the container to afford fluid communication between interior of the liner and the chamber. The valve assembly includes a valve shaft having end portions rotatably connected with the housing and a cylindrical body portion extending transversely across the chamber. The shaft body portion contains a slot extending between the end portions for receiving a generally circular butterfly valve disc. The disc has a maximum diameter corresponding with the diameter of the chamber and a minimum diameter corresponding with the length of the slot. An O-ring is connected with the outer edge of the disc. When the valve shaft is rotated to an open position, the disc is arranged longitudinally of the chamber to permit the flow of liquid from the container through the chamber. When the valve shaft is rotated to a closed position, the disc is arranged transversely of the chamber to prevent liquid from flowing therethrough.

15 Claims, 11 Drawing Figures

DISCHARGE VALVE FOR BULK CONTAINERS

BACKGROUND OF THE INVENTION

The present invention relates to an improved valve assembly for discharging liquid from bulk containers, and more particularly disposable bulk containers. Such containers, which are used in place of conventional 55 gallon steel or fiber drums, steel or fiberglass bulk totes, and wirebound crates, typically comprise an outer shell which may be formed of corrugated fiberboard and an inner liner formed of flexible synthetic plastic material. The containers may have a capacity of up to 330 gallons, i.e. six times greater than the capacity of conventional steel drums, and are typically strapped to a wooden pallet for ease of transportation and handling. The improved valve assembly of the present invention provides a low-cost, efficient re-sealable device for discharging selected quantities of liquid from the bulk liquid containers.

BRIEF DESCRIPTION OF THE PRIOR ART

Various types of butterfly valve assemblies are known in the patented prior art, as evidenced by the U.S. patents to Hughes et al U.S. Pat. No. 4,093,178, Nakai et al U.S. Pat. No. 3,980,272, Lunde U.S. Pat. No. 2,745,360, and La Valley U.S. Pat. No. 4,540,457. The Hughes et al and Nakai et al patents, for example, each disclose butterfly valves with O-ring seals while the Lunde and Hughes et al patents disclose locking mechanisms for locking a butterfly in a selected, i.e. closed, position. The LaValley patent teaches a butterfly valve assembly wherein the valve housing and the butterfly valve disc and shaft are all formed of synthetic plastic material.

The patent to Fremow et al U.S. Pat. No. 4,585,143, which is incorporated herein by reference, discloses a liquid bulk container having an outer corrugated fiberboard shell and a dual-walled plastic lining. A pair of spigots are connected with an opening in the container wall, and a flexible hose is connected with the spigots to facilitate draining of the container.

While the prior valve devices normally operate satisfactorily, they each possess inherent drawbacks which make them unsuitable for use in connection with bulk containers where the large volume of stored liquid produces very high pressure on the valve assembly. These high pressures make the prior valve assemblies difficult to operate and to retain in their closed positions. The prior valve assemblies are also normally provided separately from any container with which they are used, thereby increasing the cost of the valve and requiring a separate assembly step of applying the valve assembly to the spout of the container. Moreover, prior bulk container valves may not be removed from the container until the bag was empty.

The present invention was developed in order to overcome these and other drawbacks of the prior valves by providing an improved, economical, convenient re-sealable butterfly valve assembly forming a part of the flexible liner bag of a liquid bulk container for dispensing liquid therefrom. More particularly, the improved valve assembly of the present invention includes a floating disc capable of equalizing variations in pressure in the walls of the container.

SUMMARY OF THE INVENTION

Accordingly, it is a primary object of the present invention to provide a valve assembly for discharging liquid from a bulk container having an outer corrugated fiberboard shell and an inner liner formed of flexible synthetic plastic material. The valve assembly includes a longitudinal tubular housing defining a generally cylindrical chamber open at its opposite ends. The housing includes an annular flange extending radially outwardly from one end thereof which is connected with the container liner adjacent a liner opening to permit fluid communication between the interior of the container liner and the chamber. A butterfly valve is connected with the housing for rotation between open and closed positions relative to the chamber to control the flow of liquid therethrough. More particularly, the valve includes a valve shaft having end portions rotatably connected with the housing on opposite sides of the chamber, respectively, and a generally cylindrical body portion extending transversely across the chamber. The body portion contains a slot extending between the shaft end portions. A generally circular disc is arranged in the slot and connected with the shaft. The disc has a maximum diameter corresponding with the diameter of the chamber with flattened peripheral portions adjacent the shaft end portions, and a minimum diameter corresponding with the length of the slot. An O-ring is connected with the outer edge of the disc and is compressed between the slot and the disc. When the valve is rotated to the open position, the disc is arranged longitudinally of the chamber to permit the flow of liquid from the container through the housing. When the valve is rotated to the closed position, the disc is arranged transversely of the chamber to prevent liquid from flowing through the housing.

According to a more specific object of the invention, the disc and shaft contain aligned openings for receiving a screw to connect the disc with the shaft. The disc opening preferably is greater in diameter than that of the screw to provide the disc with a limited degree of floating movement relative to the shaft, whereby the disc may move to equalize liquid pressure against the housing.

According to another object of the invention, the valve includes a removable plug arranged in the housing chamber adjacent the butterfly valve when the valve is in the closed position. The plug includes a circular disc having an outer diameter corresponding with the diameter of the chamber on an O-ring connected with the peripheral edge of the disc, whereby the plug is wedged within the housing chamber to prevent leakage of fluid and to prevent the valve from being rotated from the closed position.

BRIEF DESCRIPTION OF THE FIGURES

Other objects and advantages of the invention will become apparent from a study of the following specification when viewed in the light of the accompanying drawing in which.

DETAILED DESCRIPTION

Figure 1:
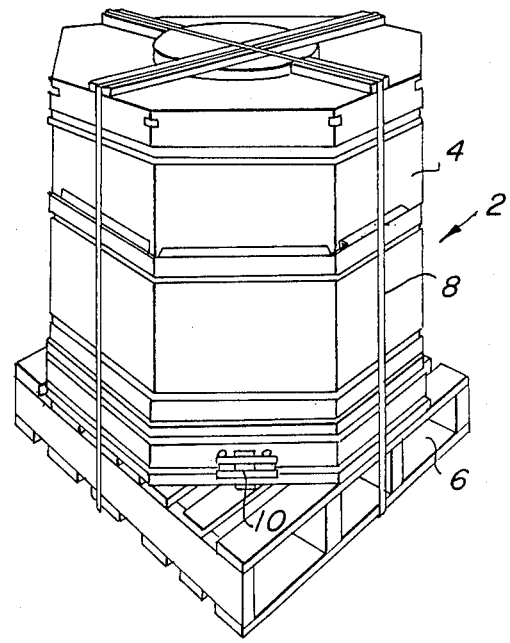
FIG. 1 is a front perspective view of a conventional liquid bulk container.

Referring first to FIG. 1, a conventional liquid bulk container 2 is shown. The container includes an outer shell 4 formed of corrugated fiberboard and an inner liner (not shown) formed of flexible synthetic plastic material. The container, which may hold as many as 330 gallons of liquid, is placed on a wooden pallet 6 and strapped thereto by metal or nylon bands 8. The palletized construction provides adequate support for the heavy filled container, which nonetheless is relatively portable through use of a forklift. The conventional bulk container includes a folded dispensing tube 10 connected with the liner via a spigot (not shown).

The butterfly valve assembly according to the invention is designed to replace the spigot and folded tube of the prior containers to accurately control the dispensing of liquid from the container. As will be developed below, the valve assembly is of simple low cost construction which is disposable with the container following use.

Figure 3:
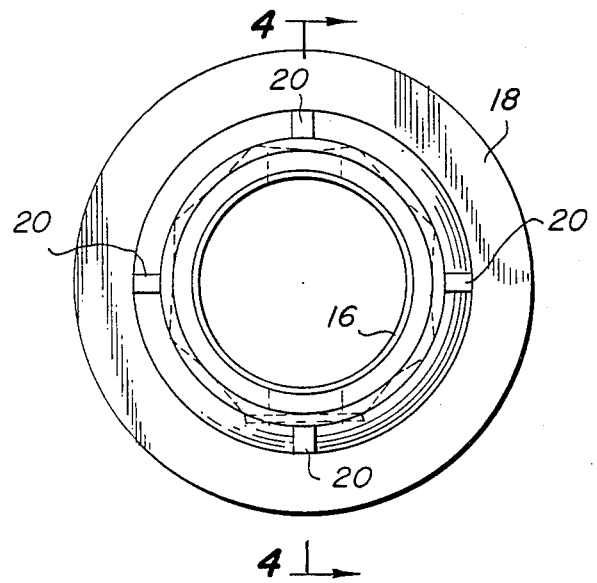
FIGS. 2 and 3 are front and top plan views, respectively, of the improved valve assembly according to the invention.
Figure 2:
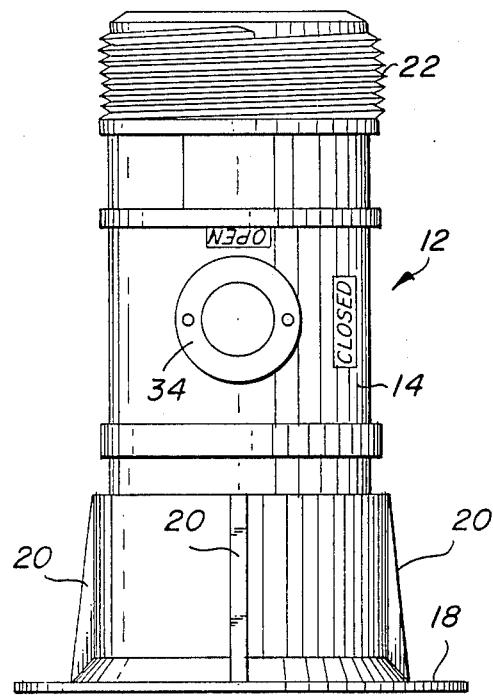
Figure 4:
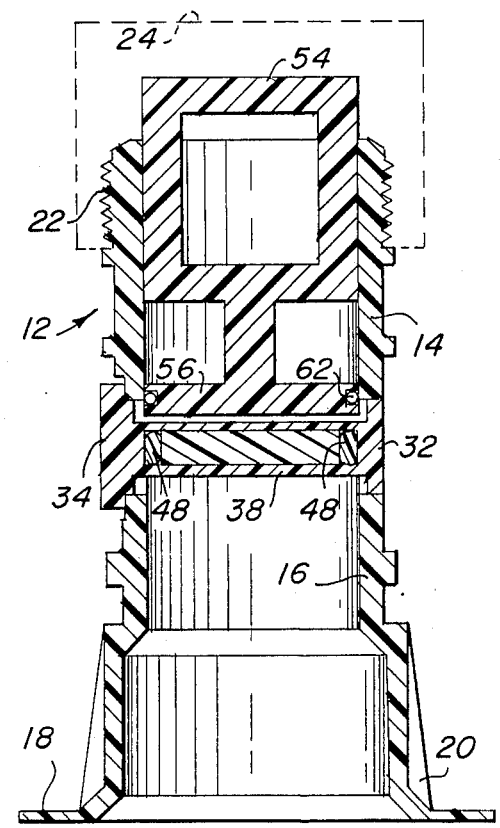
FIG. 4 in a front sectional view of the valve assembly taken along line 4—4 of FIG. 3, illustrating the valve in the closed position with the valve plug in place.

As shown in FIGS. 2–4, the valve assembly 12 includes a longitudinal tubular housing 14 defining a generally cylindrical chamber 16 open at its opposite ends. At one end of the housing is provided an annular flange 18 extending radially outwardly from the housing. The flange 18 facilitates connection of the housing with the liner of the container adjacent an opening provided toward the bottom of the liner. Preferably the annular flange 18 is heat sealed or sonically welded to the inner surface of the liner adjacent the opening with the remainder of the housing extending exteriorly of the liner and with the valve housing chamber 16 in fluid communication with the interior of the liner. With the liner and valve thus assembled essentially as an integral unit, the liner may then be arranged in the container shell with the valve housing protruding from an opening therein. This arrangement facilitates assembly of the container to minimize its cost of construction.

A plurality of arcuately spaced longitudinal flanges 20 are connected with the annular flange 18 and extend to the valve housing as shown in FIGS. 2 and 4. The longitudinal flanges 20 prevent rotation of the housing 14 relative to the container liner.

The outer surface of the other end of the housing 14 is threaded at 22 to receive a protective cap 24 during transport of the container. Once the container is on site and ready for liquid dispersement, the cap is removed and a hose is connected with the housing threaded end in a conventional manner to receive the liquid from the container.

Figure 5:
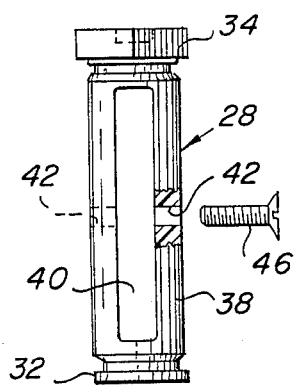
FIGS. 5 and 6 are front and top plan views, respectively, of the valve shaft of the valve assembly.
Figure 6:
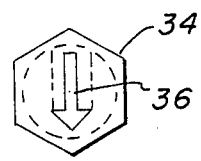

A butterfly valve assembly 26 (FIG. 9) is connected with the valve housing 14 for rotation between open and closed positions relative to the housing chamber 16 to control the flow of fluid therethrough. More particularly, the butterfly valve assembly includes a valve shaft 28 shown in detail in FIGS. 5 and 6 and a generally circular disc 30 shown in FIGS. 7 and 8 connected therewith.

The valve shaft includes end portions 32, 34, rotatably connected with the housing on opposite sides of the chamber. More particularly, the housing 14 contains a pair of openings on opposite sides of the chamber to receive the valve end portions 32, 34, respectively, as shown in FIG. 4. The valve end 34 protrudes from the housing opening to afford rotation of the shaft. For example, the valve end 34 has a hex nut configuration to receive a wrench which is used to rotate the shaft. Alternatively, a slot may be provided in the end 34 to receive a screwdriver for rotating the shaft. An indicator such as an arrow 36 may be provided to indicate whether the shaft is in the open or closed position.

The valve shaft 28 also includes a generally cylindrical body portion 38 which extends transversely across the housing chamber 16 as shown in FIG. 4. The valve shaft body portion contains a through-slot 40 which extends between the shaft end portions.

The butterfly valve disc 30 is arranged in the slot and is connected with the shaft. More particulary, the shaft contains aligned openings 42 and the disc contains an aligned opening 44 which openings are adapted to receive a screw 46 for connecting the disc with the shaft. The shaft and disc openings are preferably arranged along the axis of the valve housing 14, and the diameter of the disc opening 44 is greater than the diameter of the screw 46 to provide the disc with a limited degree of floating movement relative to the shaft, whereby the disc may move to equalize liquid pressure against the housing.

Figure 7:
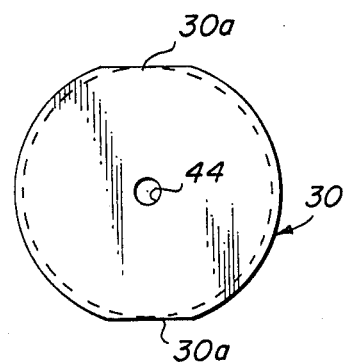
FIGS. 7 and 8 are front and top plan views, respectively, of a butterfly valve disc of the invention.
Figure 8:
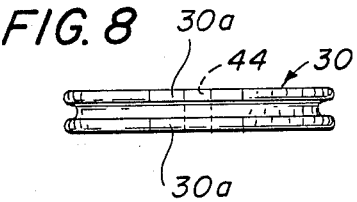

As set forth above and as shown in FIG. 7, the disc has a generally circular configuration with a maximum diameter corresponding with the diameter of the chamber and a minimum diameter corresponding with the length of the valve shaft slot. The minimum diameter of the disc is the result of flattened peripheral portions 30a adjacent the shaft end portions 32, 34, respectively.

Figure 9:
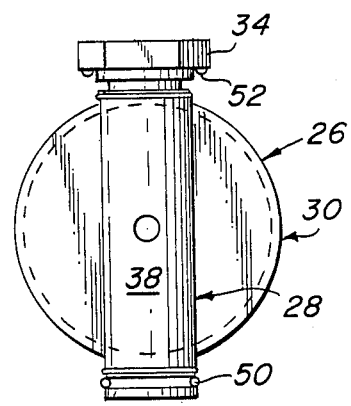
FIG. 9 is a front plan view of the valve shaft and disc in the assembled condition.

The butterfly valve disc 30 contains a peripheral groove 46 around the edge thereof to receive an O-ring 48 as shown in FIG. 4. The O-ring is compressed between the slot and the disc flattened portions. Sealing rings 50, 52 are also connected with the valve shaft between the O-ring 48 and the shaft end portions 32, 34 as shown in FIG. 9. When the valve shaft 28 is rotated by a tool to the open position, the butterfly valve disc 30 is arranged longitudinal of the housing chamber 16 to permit the flow of liquid from the container liner through the housing chamber. When the valve shaft is rotated to the closed position, the disc is arranged transversely of the chamber to prevent liquid from flowing therethrough.

Figure 10:
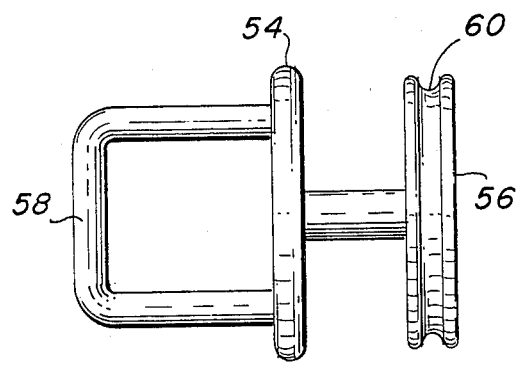
FIGS. 10 and 11 are front and side plan views, respectively, of the valve plug according to the invention.
Figure 11:
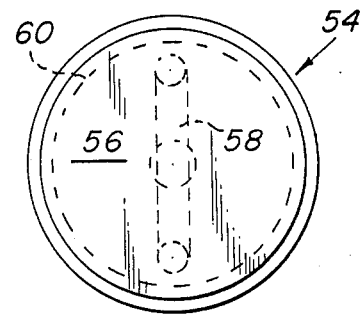

In order to retain the valve in its closed position during transport and to prevent any extraneous leakage, a plug member 54 is provided as shown in FIGS. 4, 10, and 11. The plug is removably arranged in the housing chamber when the butterfly valve is in the closed position as shown in FIG. 4. The plug is inserted into the chamber from the threaded end of the housing and abuts against or rests adjacent the valve disc to prevent more than limited movement of the butterfly valve from its closed position.

The plug 54 includes a circular disc portion 56 and a handle portion 58 formed as an integral assembly. The circular disc portion 56 has an outer diameter corresponding with the diameter of the chamber. The disc portion contains a peripheral groove 60 about its outer edge for receiving an O-ring 62 which is seated in the groove. When the plug is inserted into the chamber, it is wedged in place owing to the dimensions of the disc and O-ring relative to the chamber to prevent fluid from passing the plug and to prevent the butterfly valve from being rotated from the closed position.

The entire valve assembly is of inexpensive construction. The housing, plug, and butterfly valve shaft and disc are preferably formed of a rigid synthetic plastic material such as high density polyetlylene, whereby the valve assembly may be discarded with the disposable container. The valve, which is formed as an economical component of the container liner, enables the liner to be resealed in the event only a portion of the liquid from the container is to be dispensed at any one time.

While in accordance with the provisions of the patent statute the preferred forms and embodiments of the invention have been illustrated and described, it will be apparent to those skilled in the art that various changes and modifications may be made without deviating from the inventive concepts set forth above.

What is claimed is:

1. In a bulk liquid container including an outer shell and an inner liner formed of flexible synthetic plastic material, a valve assembly for discharging liquid from the container, comprising
    (a) a longitudinal tubular housing defining a generally cylindrical chamber open at its opposite ends, said housing including an annular flange extending radially outwardly from one end thereof, said flange being connected with the container liner adjacent a liner opening, thereby to permit fluid communication between the interior of the container liner and said chamber; and
    (b) butterfly valve means connected with said housing for rotation between open and closed positions relative to said chamber to control the flow of liquid therethrough, said valve means including
        (1) a valve shaft including end portions rotatably connected with said housing on opposite sides of said chamber, respectively, and a generally cylindrical body portion extending transversely across said chamber, said body portion containing a slot extending between said shaft end portions;
        (2) a generally circular disc arranged in said slot and connected with said shaft, said disc having a maximum diameter corresponding with the diameter of said chamber and having flattened peripheral portions adjacent said shaft end portions, respectively, said disc having a minimum diameter corresponding with the length of said slot; and
        (3) an O-ring connected with the outer edge of said circular disc, said O-ring being compressed between said slot and said disc, whereby when said valve means is rotated to the open position, said disc is arranged longitudinally of said chamber to permit the flow of liquid from the container through said housing, and when said valve means is rotated to the closed position, said disc is arranged transversely of said chamber to prevent liquid from flowing therethrough.

2. Apparatus as defined in claim 1, wherein said disc edge contains a peripheral groove within which said O-ring is arranged.

3. Apparatus as defined in claim 2, wherein said disc and said shaft contain aligned openings, and further comprising screw means arranged in said aligned openings for connecting said disc with said shaft.

4. Apparatus as defined in claim 3, wherein said disc opening has a diameter greater than the diameter of said screw means to provide said disc with a limited degree of floating movement relative to said shaft, whereby said disc may move to equalize liquid pressure against said housing.

5. Apparatus as defined in claim 4, wherein said housing further includes a plurality of arcuately spaced longitudinal flanges connected with said annular flange to prevent rotation of said housing relative to the container shell.

6. Apparatus as defined in claim 5, wherein said housing contains a pair of aligned tranverse openings for receiving said shaft end portions, respectively.

7. Apparatus as defined in claim 6, wherein one of said shaft end portions protrudes from said housing opening and includes means for rotating said shaft.

8. Apparatus as defined in claim 7, wherein said butterfly valve means further includes sealing rings connected with said shaft between said O-ring and said shaft end portions, respectively.

9. Apparatus as defined in claim 1, and further comprising a removable plug arranged in said housing chamber adjacent said butterfly valve means when said butterfly valve means is in the closed position.

10. Apparatus as defined in claim 9, wherein said plug is removable from the other end of said housing.

11. Apparatus as defined in claim 10, wherein said plug includes a circular disc having an outer diameter corresponding with the diameter of said chamber.

12. Apparatus as defined in claim 11, wherein said plug disc contains a peripheral groove about the outer edge thereof, and wherein said plug includes an O-ring seated in said plug disc groove, whereby said plug is wedged within said housing chamber to prevent fluid from passing thereby and to prevent said butterfly valve means from being rotated from the closed position.

13. Apparatus as defined in claim 12, wherein said plug includes a handle portion extending in the direction of said other housing end.

14. Apparatus as defined in claim 13, wherein said housing, said shaft, and said disc are formed of synthetic plastic material.

15. Apparatus as defined in claim 14, wherein said synthetic plastic material comprises high density polyethylene.

* * * * *

UNITED STATES PATENT AND TRADEMARK OFFICE
CERTIFICATE OF CORRECTION

PATENT NO. : 4,717,120
DATED : January 5, 1988
INVENTOR(S) : W. Douglas Fremow et al It is certified that error appears in the above-identified patent and that said Letters Patent is hereby corrected as shown below:

On the title assignee should read

-- (73) Assignees: Boise Cascade Corporation, Boise, Idaho

B-Bar-B Corporation, New Albany, Indiana, Part interest --.

Signed and Sealed this

Nineteenth Day of July, 1988

Attest:

DONALD J. QUIGG

Attesting Officer

Commissioner of Patents and Trademarks